Patented Feb. 16, 1954

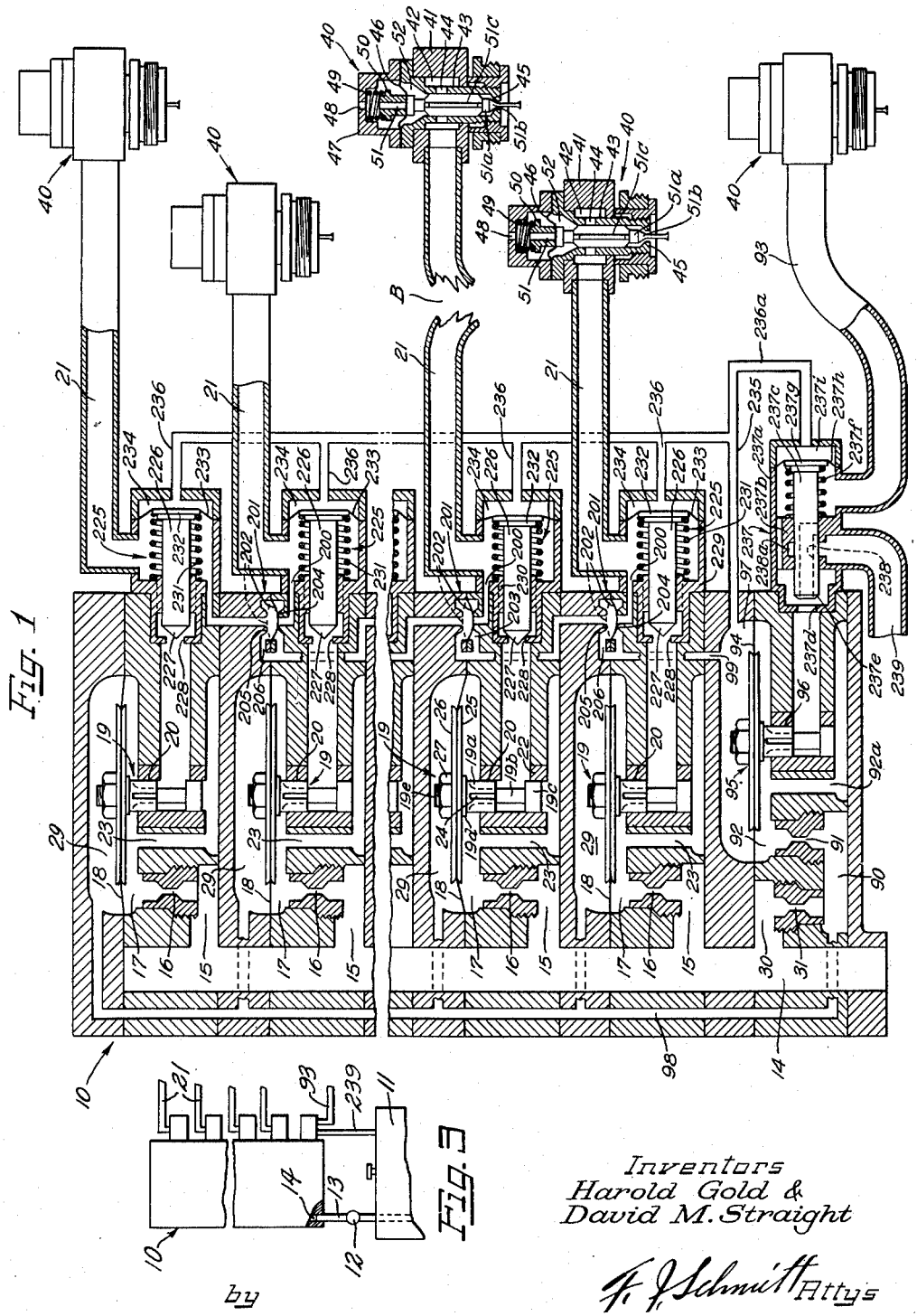

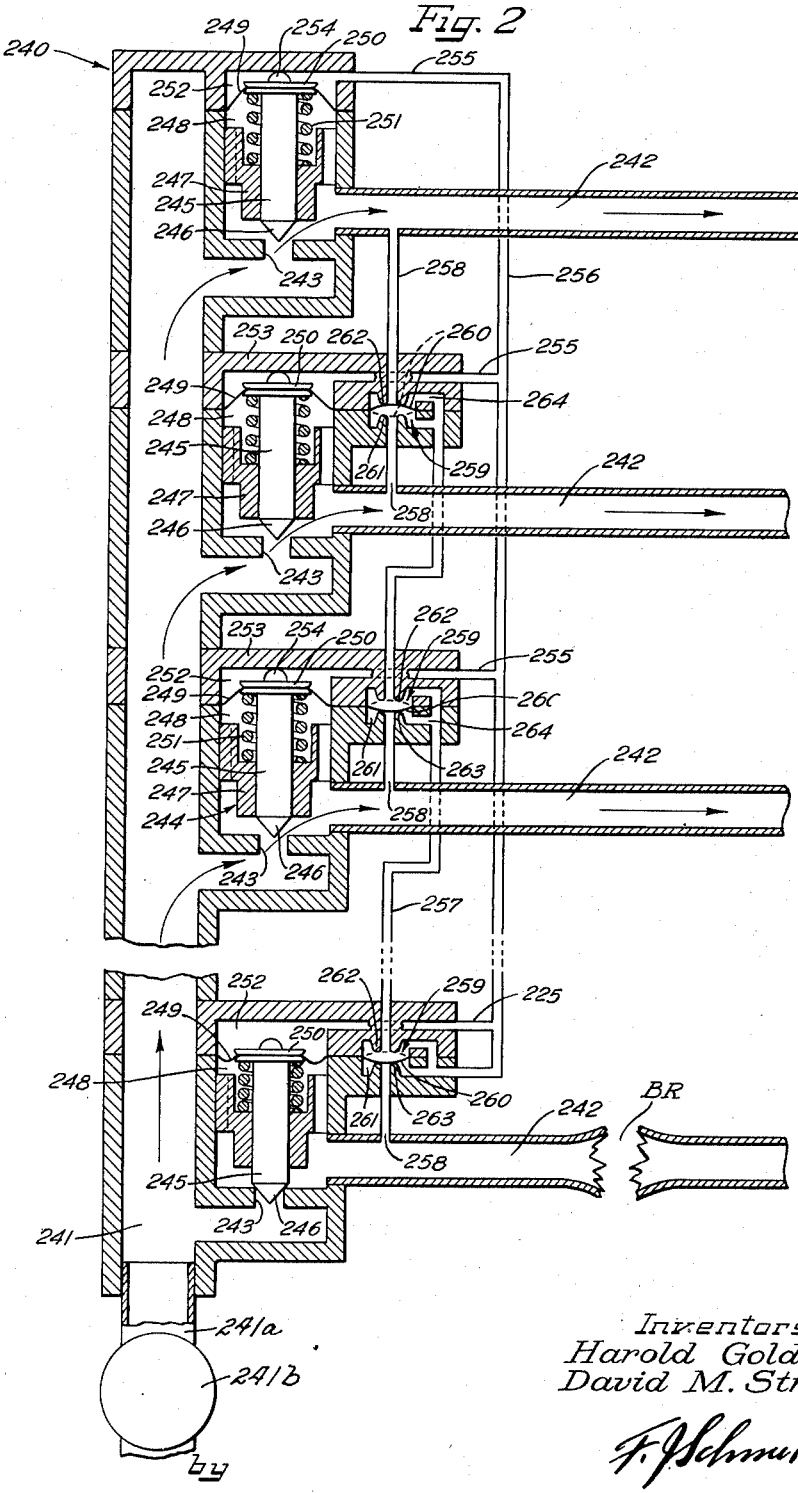

2,669,482

UNITED STATES PATENT OFFICE 2,669,482

FLUID METERING SYSTEM

Harold Gold, East Cleveland, and David M.
Straight, Cleveland, Ohio

Application July 30, 1948, Serial No. 41,643

13 Claims. (Cl. 299—58)

(Granted under Title 35, U. S. Code (1952),
sec. 266)

The present invention relates to improvements in fluid distribution systems and more particularly concerns the distribution of fluid through a plurality of flow passages and with safeguards for automatically shutting off the flow through any passage in which a break may occur.

The present application is a continuation-in-part of our copending application Serial No. 734,840, filed March 14, 1947.

In our aforesaid parent application we have disclosed methods and devices for maintaining a predetermined flow ratio of fluid such as liquid fuel from a common source to a plurality of outlets. We pointed out therein how the invention finds utility in the control of fuel distribution in gas turbine engines, or other apparatus or operating organizations where a fluid must be distributed in particular ratio or proportion to or through a plurality of passages.

In many types of fluid-distribution systems, the likelihood of breakage of one of the distributing lines constitutes a serious hazard. For example, in the manifold fuel-distributing system employed in gas-turbine engines for feeding the various fuel-atomizing nozzles, breakage of any one line that feeds a nozzle would result in the starving of the remaining nozzles, in addition to the dangerous fire hazard resulting from the leaking fuel. In military aircraft combat damage causing rupture of any fuel line could result in immediate stoppage of the engine, as well as present a great danger of fire resulting from the fuel flowing from the broken fuel line. Another example is in hydraulic brake systems where the failure of a single line that feeds one brake would make the remaining brakes useless.

Hydraulic fuse devices are known that operate to shut off flow in the event that the rate of flow through the fuse exceeds a preset value. This type of fuse cannot be used in systems of the type described because of the wide range of flow rates that are employed. If the fuse of the flow-rate-responsive type is set to close at a flow rate slightly above the maximum operating flow rate, the fuse would not act to close in the event of line breakage at a low operating flow rate.

By the present invention we provide improved method and means in fluid-distributing systems for automatically and promptly shutting off any of a plurality of flow passages that may become broken, and purely in response to pressures developed in the system itself entirely independent of flow rate. Our hydraulic fuse arrangement can therefore be employed in systems which operate over any range of flow rates.

An important object of the present invention is to provide improvements in fluid-distribution systems whereby a break occurring in any of a plurality of fluid passages will result promptly and automatically in closing of the broken line or passage.

Another object of the invention is to provide for the automatic and immediate shutting off of any broken line in a multi-line fluid-distribution system by action of the pressure in the remaining properly functioning lines.

A further object of the invention is to provide an improved fluid fuse arrangement for multi-line fluid-distribution systems.

Still another object of the invention is to provide a fluid control system wherein proportional or predetermined ratio flow through a plurality of fluid lines is maintained in spite of complete breakage failure of any of the lines.

Other objects, features, and advantages of the present invention will be readily apparent from the following detailed description of certain preferred embodiments thereof, taken in conjunction with the accompanying two sheets of drawings, in which:

Figure 1 is a schematic sectional view illustrating a system for equally or proportionally distributing fluid, such as liquid fuel, to and through a plurality of flow passages or ducts which are liable to rupture;

Figure 2 is a schematic sectional view of a simple manifold and fluid-distribution branch arrangement including our novel fluid fuse safety means; and Figure 3 is a fragmental schematic view of the apparatus of Figure 1 disclosing a pressure fluid source.

In Figure 1 is shown an apparatus 10 in which fluid such as liquid fuel for a gas-turbine engine or the like, and derived from any one or more sources under pressure is delivered to a plurality of passageways or ducts for conducting the fuel to individual outlets or orifices such as jet nozzles 40 delivering to the combustion chamber (not shown) of a gas turbine engine. In such a system it is important that the combustion chamber receive identical amounts of atomized liquid fuel from each nozzle despite a wide range of factors which may disturb or alter the fuel flow in any one of the passages serving as a pilot, or in any of the other fluid passages. Since such a system is especially adapted for use in a turbojet aircraft, and such aircraft is especially important for military purposes, battle damage rupture presents a substantial hazard.

Fluid from any suitable source such as a tank 11 (Fig. 3) and under pressure created by means such as a pump 12 is delivered through a duct 13 to a manifold passage 14 from which the fluid flows through a plurality of distributing branches or passages 15. In each of the passages 15 the fluid must travel through a metering jet or orifice 16 to a chamber 17 bounded on one side by a limp diaphragm 18 carrying a valve plug 19 which controls flow through an orifice 20 to a passage 21 leading to the respective atomizing nozzle 40. The valve plug 19 has a slotted or grooved cylindrical end portion 19a adjacent to the diaphragm 18 and snugly slidable in the orifice 20 and connected through a rod portion 19b with a second cylindrical portion 19c snugly slidable in a surrounding seat or bearing 22. A passageway 23 connects the chamber 17 with the bottom face of the cylindrical portion 19c whereby the static fuel pressure in the chamber 17 is caused to act on the entire area of the diaphragm 18. The areas of the cylindrical portions 19a and 19c exposed to the passageway 21 are equal so that the forces resulting from static fuel pressure in the passageway 21 are balanced.

Metering passages through the orifice 20 are provided by grooves or slots 24 extending longitudinally of the cylindrical portion 19a. The grooves 24 are closed at their upper ends by a head 19d on the top of the cylindrical portion 19a. The lower ends of the grooves 24 communicate through the bottom of the cylindrical portion 19a to discharge into the passageway 21. Thus, the flow rate through the orifice 20 is determined by the proportion of the upper ends of the grooves 24 that is exposed to the chamber 17.

In order to anchor the plug valve 19 to the diaphragm 18, a washer 25 is bottomed on the head 19d of the plug 19 and underlies the central portion of the diaphragm 18 while a second washer 26 overlies the diaphragm 18 concentric with the washer 25 and a nut 27 threaded on the upper end 19e of the plug clamps the washers 25 and 26 onto the diaphragm.

Above each of the diaphragms 18 is a chamber 29 which is separated from the chamber 17 by the diaphragm.

One of the fluid conducting passages or branches that leads from the manifold passage 14 is utilized as a pilot. This pilot branch passage is identified at 30 and contains a pilot orifice 31 which discharges into a chamber 90 whence the fluid must pass through a jet or orifice 91 into a chamber 92. A passage 93 affords communication between the chamber 92 and the atomizing nozzle 40 associated with the passageway. The chamber 92 has thereacross a limp diaphragm 94 carrying a metering plug valve 95 slidably mounted in a metering orifice 96 by which communication is afforded between the chamber 92 and the passageway or line 93. The plug valve 95 and its connection with the diaphragm 94 may be just like the plug valves 19 and their connection with the respective diaphragm 18 and therefore it is not believed necessary to go into a detailed description thereof. Movement of the valve 95 to adjust the metering slots or grooves therein relative to the orifice 96 is effected by flexing of the diaphragm 94. Equalizing passageway 92a affords communication between the chamber 92 and the free end portion of the plug valve member 95.

Above the diaphragm 94 is provided a static pressure chamber 97.

In operation of the apparatus variations in fluid pressure in the chamber 92 are reflected in corresponding variations in the pressure in the chamber 90 and by way of a branched duct 98 in each of the chambers 29. This causes the pressure in the static pressure chamber 90 to be effective in the static pressure chambers 29 above the valve controlling diaphragms 18 to vary the positions of the respective control or throttle valves 19. Decreases in pressure permit the diaphragms 18 to move into the respective chambers 29 and thus permit fluid pressure in the respective chambers 17 to act on the diaphragms to open the valves 19 correspondingly. On the other hand, increases in pressure in the chambers 29 act on the respective diaphragms 18 to force the same in opposition to fluid pressure in the chambers 17, thus tending to close the throttle valves 19 and restrict flow to the respective passages 21.

Any change in resistance to fluid flow in any of the discharge passages 21 will be transmitted back as a change in pressure in the respective chamber 17 which feeds the passage 21 thus affected. This change in pressure causes the diaphragm 18 associated with such passage 21 to alter the position of the plug valve 19, thus varying the free area through the slots 24 thereof until the pressure balance between the chamber 17 and the chamber 90 is restored. The static pressures on the downstream side of each metering jet or orifice 16 is therefore maintained equal. Since the manifold passage 14 is relatively large, the effect of fluid friction is negligible and all of the branch metering orifices 16 receive the fuel at the same static pressure. The static pressure drops across the metering jets or orifices 16 are therefore maintained equal, independently of differences in resistance to fluid flow in any of the passages 21.

When it is desired to maintain equal rates of flow in each of the pasages 21, as in the application of this system to a multi-burner gas turbine engine, the branch metering orifices 16 are provided with equal orifice apertures. In other applications where it may be desired to maintain a definite ratio, other than unity, between the rates of flow in the passages 21, it is practicable to do so by using branch metering jets or orifices 16 which have openings therethrough sized for giving the desired flow ratio.

Although the burner nozzles 40 may be of any preferred construction they are shown as of the spring-loaded diaphragm-operated type, each including a housing 41 with which the associated passageway duct 21 communicates. The housing is centrally apertured and has an annular chamber 42 into which the associated passageway 21 feeds. A tubular body 43 extends through each housing 41 and has ports 44 in its side wall communicating with the annular passage 42. The bottom end of the tubular member 43 has a valve seat 45 thereon, while the upper end of the member is closed by a diaphragm 46. A cap 47 clamps the diaphragm on the member 43. The cap is vented to atmosphere as at 48 and bottoms a coil spring 49 which acts on an adjustable nut 50 on a stem 51 of a valve member 51a. The stem 51 projects through the central portion of the diaphragm 46. The valve member 51 slides in the body 43 and has a needle-like bottom end 51b coacting with the seat 45 to close the nozzle. The main body of the valve has grooves 51c along the length thereof for feeding fluid from the ports 44 to the valve seat 45 as well as to a chamber 52 closed by the diaphragm 46. The spring 49 loads the valve member 51 so that it will remain on its seat 45 until a predetermined pressure has been built up in the diaphragm chamber 52, whereupon the diaphragm will be forced upwardly to lift the valve off of its seat 45 and open the metering passages 51c for discharge. Through this arrangement it will be apparent that predetermined pressure will be developed in each of the passages 21 and 93 as determined by the adjustment of the associated pressure responsive nozzle 40.

Not only are the branch passages 21 influenced and maintained in predetermined ratio or unity of fluid flow with the pilot passage 93, but consequential variations in pressure in the respective passages 21 are reflected in control of all of the companion passages 21 and the pilot passage 93 to vary the pressure therein correspondingly. Herein this is accomplished by having the static pressure chamber 97 in check-valved communication with each of the passages 21 by way of a duct 99. A branch duct 200 leads from each of the respective passages 21 to the duct passage 99. In control of communication between each of the branches 200 and the duct 99 is a respective check valve 201 which comprises a limp diaphragm 202. This diaphragm may conveniently be an extension of the respective limp diaphragm 18 and extending across a check valve chamber 203 in each instance. The check valve diaphragm 202 is disposed in the chamber 203 medially between and engageable with equal facility with spaced, opposed valve seats 204 and 205 and respectively situated at the mouths of the ducts 200 and/or portions of the duct 99 which lead from adjacent passages 21. In each instance, a bypass passage 206 connects each side of the limp diaphragm 202 in the chamber 203.

During operation of the system, the diaphragm 202 seats the seat 204 or 205 opposite the highest pressure; or stated another way, moves toward the seat offering the lowest pressure, remaining inert when the pressures are equal or substantially equal. Thus, should there be a consequential pressure increase in one of the passages 21, the associated diaphragm valve 202 moves away from the seat 204 of the duct 200 leading from such passage 21 and seeks the opposite seat 205, thereby transmitting the increased pressure from the affected passage 21 by way of the duct 99 to the pilot chamber 97. This drives the diaphragm 94 and thereby the valve 95 into restricting relation within the orifice 96 whereby to throttle flow through the pilot passage 93 and develop a back pressure which is reflected in the pilot chamber 90. The increased pressure is transmitted through the duct 98 to the static throttle valve pressure chambers 29 and acts upon the diaphragms 18 to effect a throttled flow condition in each of the passages 21 corresponding to the diminished fluid flow prevailing in the passage 21 in which the pressure variation originated. Since the check valve diaphragms 202 are free to move to the seat 204 or 205 offering lowest pressure, it will be apparent that the highest pressure from any of the passages 21 will be transmitted directly and solely to the pilot throttle valve chamber 97 and will not bypass into any of the other passages 21. In Figure 1 it is presumed that the highest pressure is reflected in the topmost passage 21 and it will be observed that all of the check valve diaphragms 202, in the full line positions thereof block transmission of the high pressure to any of the passages 21 intervening between the topmost one and the pilot. The dash line positions of the diaphragms indicate their position when the immediately associated passage 21 offers the highest pressure to which the system must be adjusted.

The fluid control system as thus far described, it will be apparent, automatically maintains the predetermined condition of equality or proportion in the several nozzle feeding streams or passages. However, if any one of the lines providing any of the passages 21 become ruptured as by battle damage in a combat airplane the throttle valve 19 thereof will tend to respond to the inevitable pressure drop to assume a minimum or throttled flow position to maintain the flow rate through the broken line equal to the flow rate through the remaining lines. The fuel escaping from the broken passage 21 would constitute a fire hazard.

Insofar as the pilot stream is concerned, if the passage 93 becomes ruptured the throttle valve 95 thereof will, of course, tend to close completely and shut off all flow therethrough because sufficient pressure for this will be developed in the throttle valve chamber 97 as a result of the pressure from the passages 21 as transmitted to the throttle valve chamber by the duct 99.

According to the present invention positive means are provided for completely blocking or shutting off all possibility of leakage of fluid through any ruptured passage 21. Herein this comprises a fluid fuse or valve 225 interposed in each of the passages 21 and of a character to remain normally open so as to avoid any interference with free flow of fluid through the passage during proper operating conditions but arranged to be slammed shut promptly upon a break occurring in its passage 21.

Each of the hydraulic fuses or valves 225 comprises, as a principal component, a valve plunger 226 having a more or less pointed valve end 227 herein shown as conical adapted to cooperate in sealing relation with a valve seat 228 provided by a tubular valve body or housing 229 appropriately interposed in the passage 21 with the opening through the valve seat 228 located downstream so that fluid through the passageway 21 must pass through the valve housing 229. The valve plug or plunger 226 is slidably guided coaxial with the seat 228 by a spider 230 which is of any preferred construction that will permit free passage of fluid past the valve plunger.

While force of fluid passing valve seat 228 and working against the valve tip 227 exerts a certain amount of valve opening pressure against the valve, it is preferred to provide the valve with positive means for normally maintaining the valve open. Herein such means comprises a coiled compression spring 231 which is bottomed against an appropriate shoulder on the housing 229 about the spider 230 and bears against the lateral flange of a head 232 on the end of the plunger 226 opposite its valve tip. Thus the valve plunger 226 is normally urged into and maintained in the open valve condition thereof.

Means are provided for promptly moving the valve plunger 226 in opposition to the load of the open-biasing spring 231 promptly upon a dangerous dropping in pressure in the associated passage 21, such closing being in response to the pressure in the remainder of the system and in particular in the remaining passages 21. To this end, a limp diaphragm 233 is operatively associated with the valve head 232. The diaphragm 233 closes the one side of a static pressure chamber 234 in back of the valve head 232 and is normally flexed into said chamber 234 by the valve head 232 in the open valve condition of the valve plunger 226. Should a dangerous pressure drop occur in any of the passages 21, as for example, by a break as indicated at B in the third passage from the top of Figure 1 pressure from the remaining passages 21, and in particular from that one of the remaining passages 21 which has the highest pressure at any given time, will exert a force in the affected static pressure chamber 234 which is greater than the load of the valve opening spring 231 which has now been relieved of the supplemental and balancing pressure of the fluid in the affected passage 21 which during normal operation of such passage acts upon the dynamic pressure side of the diaphragm 233 exposed to the dynamic fluid flow in such passage. The valve closing pressure is transmitted from the pilot valve chamber 97 by way of a duct 235 having respective branches 236 leading therefrom to the several valve head static pressure chambers 234. Thus, the instant B break occurs pressure in the passage 21 drops to zero which relieves the associated valve controlling diaphragm 233 of dynamic pressure and the static pressure developed in the check valve chamber 97 acts in the chamber 234 through the medium of the duct 235 and branch 236 to press on the diaphragm 233 and drive the valve plunger 226 into fluid checking position wherein the valve tip 227 seats sealingly against the valve seat 228. This condition will prevail as long as there is operating pressure in the remaining passages 21 or any of them, and a pressure differential is maintained on the static pressure side of the fuse valve diaphragm 233 of the broken line.

Since rupture of the pilot passage 93 and consequent stoppage of flow of the pilot stream would disrupt control of the system, means are provided for safely continuing flow through the pilot valve portion of the pilot branch passage. Such means herein comprises a three-way fuse valve 237 including a housing 237a interposed in the passage 93 immediately downstream from the pilot valve 95 and having therein a spider 237b slidably guiding a valve plunger 237c downstream of and in reciprocal seating and unseating relation to a valve orifice and seat 237d, the tip of the valve plunger having a truncated tapered seating tip 237e for this purpose. An expansile compression spring 237f acting between a head 237g on the plunger and the spider 237b normally acts to maintain the valve plunger in the open position against a diaphragm 237h which divides the space within the housing 237a beyond the head of the valve plunger into a chamber 237i shut off from the pilot stream which passes through the spider 237b and past the plunger 237c.

In the event of a rupture or other pressure failure in the passage 93, the pressure drops, and pressure from the passages 21 acting through the duct 235 by way of a branch 236a acts on the diaphragm 237h to oppose the spring 237f and forces the valve plunger against the seat about the orifice 237d. As an incident to closing of the valve plunger 237c, a by-pass passage 238 in the plunger, communicating through the tip 237e with the orifice 237d, registers with an annular groove 238a surrounding the plunger in the spider 237d. The annular groove 238a connects with a passage 239 which communicates with the fuel tank 11 or other fluid source and thus maintains by bleed-off the flow through the effective pilot portion of the pilot stream and more especially in the pilot chambers 90 and 92 and downstream from the pilot valve 95 uninterrupted.

Having reference now to the modification of Figure 2, a fluid distribution system is shown of more or less general character in that it may be used in the distribution of fluid for any one of a member of different purposes, such for example, as in distributing fuel in gas-turbine engines, for distributing the hydraulic fluid in hydraulic brake systems, or the like where a uniform or proportional flow from a common source is distributed to a plurality of branches. The apparatus is generally identified by the numeral 240 and includes a manifold passage 241 having a plurality of branch passages 242 leading therefrom. The manifold passage 241 is connected to a suitable source of fluid by means of a duct 241a and pressure-creating means such as a pump 241b may create suitable fluid pressure. Fluid from the manifold passage 241 must pass an orifice 243 in each of the branches 242, such orifice being of equal size in each instance where uniform distribution is maintained. Where fixed ratios other than unity are to be maintained among the flow rates in the various branches, the orifices 243 may be sized in direct proportion for maximum effectiveness of certain fuse valves to be described.

In order to avoid starving any of the remaining passages 242 in the system, in the event of unusual pressure drop for any reason in any of the passages 242 such as might occur due to leakage, either partial or complete, each line or passage 242 is equipped with a control or fuse valve 244. These fuse valves 244 are preferably on the same order as the fuse valve 225 previously described. Each of the valve assemblies 244 comprises a reciprocably slidable plunger 245 having a preferably tapered tip 246 which is of a size to be cooperable in closing relation with the associated orifice 243 providing a seat for the valve tip. The valve plunger 245 is disposed at the downstream side of the orifice 243 and is reciprocably slidably guided by a spider structure 247. The spider 247 affords passage for dynamic pressure fluid to a chamber 248 which is bounded at one side by a limp diaphragm 249 secured to the end of the valve plunger 245 opposite the valve tip 246 thereof, the plunger being provided for this purpose by a clamping plate or flange head structure 250. Live pressure fluid in the associated passage 242 thereby normally acts upon the diaphragm 249 to urge the valve plunger 245 to the open valve position thereof. The live or dynamic fluid pressure acting on the diaphragm 249 is supplemented by a coiled compression spring 251 acting between the spider 247 and the valve head 250 to keep the valve open. Thus, the normal condition of the fuse valve 244 in each instance is to remain open. When the passages 242 are al lat zero gauge, the respective valve biasing springs 251 keep the valve plungers 245 in the open condition. As pressure develops in the passages 242 the dynamic pressure acting on the diaphragms 249 further acts to keep the valves open.

When the pressure in any of the passages 242 drops below a normal fluctuation point, the pressure in the remaining passages 242 or at least the highest pressure in any of the remaining passages 242 is utilized to act upon the check or fuse-valve diaphragm 249 of the passage suffering the drop to drive the effected valve plunger 245 toward closing position in opposition to the biasing spring 251. To this end, the diaphragm 249 in each instance affords a separating closure between the dynamic pressure chamber 248 and a static pressure chamber 252, the latter being bounded opposite the end of the plunger 245 by a wall 253 which may be engaged by a stop knob 254 on the adjacent end of the plunger to delimit the opening movement of the plunger. Communicating with each of the static pressure chambers 252 is a duct branch 255 leading from a principal differential pressure duct 256 which at one end communicates with a pressure duct 257 having communication by way of respective branches 258 with the several passages 242. Between the branches 258 and the duct 257 are respective limp diaphragm check valves 259 which control the pressure from the several passages 242 to select the highest pressure and assure its passage by way of the duct 257 to the differential pressure duct 256.

Each of the check valves 259 preferably comprises a limp diaphragm 260 mounted across a chamber 261 having selective pressure responsive engagement with opposed spaced valve seats 262 and 263 defining the adjacent mouths of respectively the duct 257 and the branch duct 258. Where all of the pressures in the passages 242 are identical or substantially so, the check valve diaphragms 260 will remain substantially limp. However, where the pressure at one of the valve seats 262 or 263 is substantially greater, the force of such pressure causes the diaphragm to be repelled and seek the opposite valve seat which receives the same in sealing relation and thus closes off the passage therethrough. The opposite sides of the respective check valve diaphragms 260 are equally exposed to the remainder of the duct tube 257, offset from the valve seat 262 and the valve seat 263, through the medium of respective bypasses 264 whereby assurance is had that the high pressure from any one of the passages 242 will be conducted in one direction to the pressure duct 256.

In operation, the fluid distributing system of the apparatus 240 finds the fluid from the manifold passage 241 normally distributed in the preferred proportion or equality of distribution to each of the passages 242. However, should the pressure in any of the passages 242 fluctuate from a normal range, either by way of excessive pressure drop or by way of excessive pressure increase, the pressure differential is reflected in the action of the control or fuse valves 244.

Let us assume that a break BR occurs in one of the lines providing one of the passages 242. Instantly the pressure drops in that passage 242, thus relieving the fuse valve diaphragm 249 of live fluid pressure and creating a pressure differential in the static pressure chamber 252 as effected by way of the communication afforded by the branch duct 255 with the differential pressure duct 256. This drives the diaphragm 249 and thereby the associated valve plunger 245 in opposition to the bias of the spring 251 and causes the valve tip 246 to enter into valve seating relation to the orifice 243, thus closing off the ruptured passage 242 from the manifold passage 241. As long as pressure is maintained in any of the remaining passages 242 the ruptured passage will thus be maintained blocked off by the fluid checking action of the associated fuse valve 244.

The pressure differential acting to close the fuse valve 244 in any passage can exceed the preset value either by virtue of a drop in pressure in the passage 242 or a rise in pressure in the chamber 252. The rise in pressure in the chamber 252 could result from the clogging of the line 242. In this event, the blocking or clogging of any one of the lines 242 would result in the shutting off of all the fuse valves. As the fuse valve plunger 245 descends it throttles the flow but the throttling results in a further reduction in pressure in the passage 242, thereby increasing the pressure differential that acts to close the valve. The throttled pressure reduction thereby causes the valve to descend still further until completely closed. It can be seen, therefore, that once the pressure differential acting to close the fuse valve exceeds the preset valve determined by the spring load, the valve starts to move downward and then accelerates until closed. Whether or not the fuse valves all close in the event of clogging of one of the lines 242 is a matter of choice. The pressure in the passage 242 can increase upon clogging, only by an amount equal to the operating pressure drop across the orifice 243. If the size of the orifice 243 is so selected that there is at all operating flow rates a substantial pressure drop across the orifice 243, then the possible rise in pressure in the passage 242 can be enough to cause closure of the fuse valves. On the other hand, if the orifices 243 are large enough so that there is not a substantial pressure drop at all operating flow rates, the pressure in the passages 242 cannot increase sufficiently in a clogged line to cause the fuse valves to close.

It will be observed that in both of the systems described, the fluid fuse devices are entirely pressure-actuated and are not effected by flow rate. At all flow rates, the various branch line pressures rise and fall together so that the fuse valves remain under substantially equalized pressure. This fluid fuse arrangement can, therefore, be employed in systems which operate over any desired range of flow rates.

It will, of course, be understood that various details in the present disclosure may be varied through a wide range without departing from the principles of this invention and it is, therefore, not the purpose to limit the patent granted hereon otherwise than necessitated by the scope of the appended claims.

The invention described herein may be manufactured and used by or for the Government of the United States of America for governmental purposes without the payment of any royalties thereon or therefor.

We claim as our invention:

1. In apparatus of the character described, a plurality of separate fluid flow passages, means for maintaining a substantial fluid pressure in each of said passages, an orifice in each of said passages, a fluid fuse valve disposed downstream of the orifice in each respective passage and adapted for fluid checking seating at the downstream side of the orifice, means normally biasing the valve open, a diaphragm associated with each valve and normally acted upon by the dynamic fluid pressure in each of the passages, means for subjecting said diaphragms to static pressure in opposition to the dynamic pressure, the diaphragm in each instance being operable responsive to said static pressure to oppose said biasing means and close the associated valve when the dynamic pressure in the associated passage drops below a given value.

2. In apparatus for controlling the flow of fluid, means providing a plurality of ducts defining passages subject to abnormal pressure drop such as rupture of a duct defining a passage, means for delivering fluid to the passages under pressure, a respective fluid fuse valve in each passage, means for normally biasing said fuse valves open for flow of the fluid under pressure through the passages, and means for referencing each of the fuse valves to the pressure of the fluid in the other passages and in opposition to the bias impressed on said fuse valves, and operative upon abnormal pressure drop in one of the passages to impress upon the fuse valve in said one passage and in opposition to the normal bias thereon the highest pressure prevailing in any other of said passages for closing such fuse valve and stopping flow through said one passage.

3. In apparatus for controlling the flow of fluid, means defining a plurality of passages, one of which serves as a pilot passage and the remainder of which passages are in slave relation to the pilot passage, means for delivering fluid under pressure to all of said passages, means referencing the pressure of the fluid flowing through said pilot passage to the slave passages, automatic adjustment valves in the slave passages maintained by said referencing means in balanced adjustment with the pilot passage, a control valve in the pilot passage, means for referencing said control valve to the pressure in the slave passages, whereby to effect not only balancing of the slave passages with reference to the pilot passage, but also to balance the pilot passage with reference to the slave passages, and pressure-sensitive fluid fuse valve means in said passages, and means for referencing to said fuse valve means the highest prevailing pressure in the passages to close the fluid fuse valve means in any passage experiencing abnormal drop in pressure.

4. In apparatus for controlling the flow of fluid, a plurality of passages, one of which serves as a pilot passage and the remainder of which passages are in slave relation to the pilot passage, means for delivering fluid under pressure to all of said passages, means for referencing the pressure of the fluid flowing through said pilot passage to the slave passages, automatic adjustment valves in the slave passages maintained by said referencing means in balanced adjustment with the pilot passage, a control valve in the pilot passage, means for referencing said control valve to the pressure in the slave passages, whereby to effect not only balancing of the slave passages with reference to the pilot passage, but also to balance the pilot passage with reference to the slave passages, pressure-sensitive fuse valve means in said pilot passage, means for impressing upon said fuse valve means the highest pressure prevailing in any of the slave passages to close the fuse valve means upon any abnormal drop in pressure in said pilot passage and thus check flow through the pilot passage downstream from the fuse valve, and means for by-passing flow through the pilot passage upstream from the point at which the fuse valve means closes the same to maintain continuous flow in the pilot passage upstream from the fuse valve means for continuing control of the slave passages by reference to the pilot passage.

5. In combination in a multi-passage fluid flow system, a plurality of fluid flow passages, means for supplying each of the passages with fluid under pressure, an individual fluid fuse valve in each of said passages, means for normally biasing each of the fuse valves open for normal flow of fluid under pressure through the respective passages, and means for impressing upon each of the fuse valves in all of the passages the highest pressure prevailing at any time in any of the passages and directed in opposition to said biasing means.

6. In a fluid flow system including a plurality of flow passages, means for driving through the passages fluid under pressure, a fuse valve in each of the passages subjected continuously to the dynamic fluid pressure in its associated passage, means defining a static pressure head chamber for each of the fuse valves for the development in such chamber of fluid pressures in opposition to the dynamic fluid pressure impressed on the fuse valves, means effecting referencing communication between said static pressure head chambers and said passages to condition the static pressure heads in said chambers to the highest pressure prevailing at any given time in said passages, and means normally supplementing the dynamic fluid pressure for each of the fuse valves to afford a differential bias opposing the static pressure heads in said chambers and thereby normally maintaining the fuse valves open, but adapted to be overcome by abnormal pressure drop in the dynamic pressure in any passage to respond to the static pressure head in the associated chamber for closing the such passage while the remainder of the system continues functioning uninterruptedly.

7. In a multi-passage fluid distribution system, means defining a plurality of individual fluid passages, means for supplying the passages with fluid under pressure, a respective fluid fuse valve in control of each of the passages, means biasing the fluid fuse valves to remain open during normal operating pressures in the associated passages, means normally subjecting each of the fuse valves to bias-supplementing dynamic fluid pressure of its associated passage, and means defining a static pressure head chamber for each of the fluid fuse valves communicating with and receiving pressure from all of the passages to provide a static pressure head in said chamber operative upon failure of dynamic pressure in any of the passages to oppose the biasing means of the associated fluid fuse valve and close the valve to shut off the passage in which the failure occurs.

8. In a multi-passage fluid distribution system, means defining a plurality of individual fluid passages, means for supplying the passages with fluid under pressure, a respective fluid fuse valve in control of each of the passages, means biasing the fluid fuse valves to remain open during normal operating pressures in the associated passages, means normally subjecting each of the fuse valves to bias-supplementing dynamic fluid pressure of its associated passage, means defining a static pressure head chamber for each of the fluid fuse valves, means communicating with said passages and said chambers and receiving pressure from all of the passages to provide a static pressure head in said chambers operative upon failure of dynamic pressure in any of the passages to oppose the biasing means of the associated fluid fuse valve and close the valve to shut off the passage in which the failure occurs, and check valve means in said static pressure communication means for selecting the highest pressure from any of the passages to provide the fluid fuse valve closing pressure in the static pressure head chamber of the fuse valve of the passage experiencing said failure.

9. In a multi-passage fluid controlling system, means defining a plurality of fluid passages, means supplying said passages with fluid under pressure, a normally open fluid fuse valve in each of the passages, means defining a static pressure area for each of said fuse valves for impressing pressure in a closing direction upon the fuse valves, a duct having communication with each of said static pressure areas, and another duct having communication with each of said passages and communicating with the first mentioned duct for subjecting the fuse valves to the highest pressure in any of the passages, said last named duct having check valves therein for closing off communication with the passages of lesser pressure at any given time.

10. In combination in a fluid controlling system, a plurality of fluid passages, means for supplying said passages with fluid under pressure, a throttle valve in each of the passages, each of the throttle valves having an actuating diaphragm, means defining a respective space divided by each of the diaphragms to provide a dynamic pressure area on the valve side of the diaphragm and a static pressure area on the opposite side of the diaphragm, one of the passages serving as a pilot passage and having communication with the static pressure area associated with each of the throttle valves of the remaining passages which are thus placed in slave relationship to the pilot passage, duct means leading from each of said slave passages to the static pressure area associated with the pilot passage diaphragm whereby to reference the latter to the highest pressure in any of said slave passages, said duct means including check valve structures to check escape of said highest pressure to any passage of lower pressure, a fluid fuse valve in each of said slave passages normally open during operation but adapted to check fluid flow through its associated passage upon abnormal pressure drop in such passage, and a duct communicating with said static pressure area associated with the pilot passage diaphragm and with each of the fuse valves for subjecting the fuse valves in closing direction to the pressure in such static pressure area of the pilot diaphragm for closing the fuse valve in any of said slave passages in which abnormal pressure drop occurs.

11. In combination in a fluid controlling system, a plurality of fluid passages, means for supplying said passages with fluid under pressure, a throttle valve in each of the passages, each of the throttle valves having an actuating diaphragm, means defining a respective space divided by each of the diaphragms to provide a dynamic pressure area on the valve side of the diaphragm and a static pressure area on the opposite side of the diaphragm, one of the passages serving as a pilot passage and having communication with the static pressure area associated with each of the throttle valves of the remaining passages which are thus placed in slave relationship to the pilot passage, duct means leading from each of said slave passages to the static pressure area associated with the pilot passage diaphragm whereby to reference the latter to the highest pressure in any of said slave passages, said duct means including check valve structures to check escape of said highest pressure to any passage of lower pressure, a fluid fuse valve in each of said slave passages normally open during operation but adapted to check fluid flow through its associated passage upon abnormal pressure drop in such passage, and a duct communicating with said static pressure area associated with the pilot passage diaphragm and with each of the fuse valves for subjecting the fuse valves in closing direction to the pressure in such static pressure area of the pilot diaphragm for closing the fuse valve in any of said slave passages in which abnormal pressure drop occurs, each of said passages inclusive of the pilot passage having a pressure responsive discharge nozzle downstream from the fuse valve therein developing a predetermined back pressure, said back pressure being operative on the respective fuse valves in the passages to balance the pressure afforded by the duct leading from said static pressure area of the pilot diaphragm.

12. In combination in a fluid control system of the character described, a plurality of fluid passages for delivering fluid to delivery nozzles or the like, said passages being liable to failure by rupture or the like, means supplying said passages with fluid under pressure, means individually controlling each of said passages to maintain a predetermined flow relationship in all of the passages, additional means associated with one of said passages and communicating with the individual controlling means of each of the other passages so that said one passage is a pilot with which the other passages are in controlled slave relationship, individual fluid fuse valves in each of said slave passages operable in the event of rupture failure of any of said slave passages to shut off the ruptured passage, means effecting communication between the slave passages and the pilot passage control means and by way of the pilot passage control means affording communication with each of the fluid fuse valves in said slave passages, a fluid fuse control valve in said pilot passage, means affording communication with said pilot passage fluid fuse control valve and the slave passages so that upon rupture of the pilot passage the fluid fuse control valve therein will be closed, and a by-pass through the fluid fuse control valve in the pilot passage for bleed-off of normal operating flow of fluid through the pilot passage when the pilot passage fluid fuse control valve is closed so as to maintain substantially normal operation of the pilot passage upstream from the point of closure to thereby maintain substantially normal control of the slave passages through continuing operation of the pilot passage.

13. In a fluid control system of the character described, a plurality of fluid passages, means supplying the fluid passages with fluid under pressure, means for coordinating operation of the passages in the system referenced to the pressure of fluid through one of the passages serving as a pilot passage, said pilot passage being liable to failure involving abnormal pressure drop, a fluid fuse in said pilot passage downstream from the controlling communication thereof with the remainder of the system, means for closing the pilot passage fluid fuse means in the event of pressure failure in the pilot passage downstream from the fluid fuse means, and means providing a by-pass upstream of the point of closure of the pilot passage by the fluid fuse means to maintain functioning flow of fluid through the pilot passage.

HAROLD GOLD.
DAVID M. STRAIGHT.

References Cited in the file of this patent

UNITED STATES PATENTS

| Number | Name | Date |
| --- | --- | --- |
| 1,272,212 | Callan | July 9, 1918 |
| 1,893,462 | Wait | Jan. 3, 1933 |
| 1,893,657 | Schafer | Jan. 10, 1933 |
| 2,430,264 | Wiegand et al. | Nov. 4, 1947 |
| 2,438,462 | Smith | Nov. 23, 1948 |

FOREIGN PATENTS

| Number | Country | Date |
| --- | --- | --- |
| 577,132 | Great Britain | May 7, 1946 |